(12) United States Patent
Chang et al.

(10) Patent No.: US 11,699,368 B1
(45) Date of Patent: Jul. 11, 2023

(54) HEAD-UP DISPLAY FOR ACCOMMODATING COLOR VISION DEFICIENCIES

(71) Applicant: GM Global Technology Operations LLC, Detroit, MI (US)

(72) Inventors: Kai-Han Chang, Sterling Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/821,589

(22) Filed: Aug. 23, 2022

(51) Int. Cl.
G09G 3/00 (2006.01)
B60K 35/00 (2006.01)
(Continued)

(52) U.S. Cl.
CPC ............ *G09G 3/002* (2013.01); *B60K 35/00* (2013.01); *G02B 27/0101* (2013.01); *G06T 7/80* (2017.01); *G06T 7/90* (2017.01); *G06V 20/56* (2022.01); *B60K 2370/1529* (2019.05); *B60K 2370/21* (2019.05); *B60K 2370/334* (2019.05); *G02B 2027/0112* (2013.01); *G02B 2027/0118* (2013.01); *G02B 2027/0138* (2013.01); *G06T 2207/10024* (2013.01); *G06T 2207/30252* (2013.01); *G09G 2320/0242* (2013.01); *G09G 2320/0626* (2013.01); *G09G 2320/0666* (2013.01); *G09G 2360/144* (2013.01); *G09G 2360/16* (2013.01); *G09G 2380/10* (2013.01)

(58) Field of Classification Search
CPC ........... G09G 3/002; G09G 2320/0242; G09G 2320/0626; G09G 2320/0666; G09G 2360/144; G09G 2360/16; G09G 2380/10; B60K 35/00; B60K 2370/1529; B60K 2370/21; B60K 2370/334; G02B 27/0101; G02B 2027/0112; G02B 2027/0118; G02B 2027/0138; G06T 7/80; G06T 7/90; G06T 2207/10024; G06T 2207/30252; G06V 20/56
See application file for complete search history.

(56) References Cited

U.S. PATENT DOCUMENTS

| | | | |
|---|---|---|---|
| 2010/0231372 A1* | 9/2010 | Sandstrom | G01D 7/005 340/459 |
| 2015/0348477 A1* | 12/2015 | Kabe | G09G 3/3607 345/88 |
| 2021/0155159 A1* | 5/2021 | Kawate | G06V 20/20 |

\* cited by examiner

*Primary Examiner* — Brent D Castiaux
(74) *Attorney, Agent, or Firm* — Vivacqua Crane, PLLC

(57) ABSTRACT

A head-up display for displaying graphics upon a windscreen of a vehicle includes a graphic projection module for generating one or more graphic images upon the windscreen of the vehicle, a forward-facing camera collecting image data representative of a view of a surrounding environment of the vehicle visible through the windscreen, an ambient light sensor detecting a level of ambient light present in the surrounding environment of the vehicle, and one or more controllers in electronic communication with the graphic projection module, the forward-facing camera, and the ambient light sensor. The one or more controllers executes instructions to determine the level of ambient light present in the surrounding environment of the vehicle based on an ambient light signal, and adjusts a saturation level of one or more colors of the one or more graphic images generated by the graphic projection module based on the level of ambient light.

20 Claims, 7 Drawing Sheets

(51) Int. Cl.
*G02B 27/01* (2006.01)
*G06V 20/56* (2022.01)
*G06T 7/90* (2017.01)
*G06T 7/80* (2017.01)

HEAD-UP DISPLAY FOR ACCOMMODATING COLOR VISION DEFICIENCIES

INTRODUCTION

The present disclosure relates to a head-up display for a vehicle that accommodates color vision deficiencies of a user.

A head-up display (HUD) shows information such as, for example, vehicle speed and navigational instructions, directly onto a windscreen of a vehicle, within the driver's forward field of view. Accordingly, the head-up display provides drivers with information without looking away from the road. For example, the head-up display may generate graphics upon the windscreen of the vehicle including information such as vehicle speed and navigational information.

The three main types of color vision deficiencies are protanomaly, which is an anomalous response to long wavelength light by the L-cones in the retina, deuteranomaly, which is an anomalous response to medium wavelength light by the M-cones in the retina, and tritanomaly, which is an anomalous response to short wavelength light by S-cones in the retina. A color space chromaticity diagram such as, for example, the International Lighting Commission (CIE) 1931 color space chromaticity diagram relates the response of the human eye to physical colors or wavelengths in the electromagnetic visible light spectrum. An individual with color vision deficiencies may be unable to differentiate between colors located along color confusion lines in a color space chromaticity diagram. Color confusion lines are mapped for the different types of color vision deficiencies (i.e., protanomaly, deuteranomaly, and tritanomaly). Color confusion lines of equal luminance converge to a single intersection, which is referred to as a copunctal point, that corresponds to the specific type of color vision deficiency. For the same luminance, individuals with a specific color vision deficiency are unable to distinguish the colors that are co-located on the same color confusion line of the relevant color space chromaticity diagram.

It is to be appreciated that it may be difficult for the human eye to distinguish between different colors in low ambient light conditions, even for individuals with normal color vision. This is because during low ambient light conditions the human eye operates at scotopic vision, where the cone cells for distinguishing colors are not as sensitive. Accordingly, the challenges that individuals with color vision deficiencies experience when attempting to distinguish certain colors may become especially pronounced at low ambient light conditions.

Thus, while current head-up displays achieve their intended purpose, there is a need in the art for an improved head-up display that accommodates individuals affected with color vision deficiencies.

SUMMARY

According to several aspects, a head-up display for displaying graphics upon a windscreen of a vehicle is disclosed. The head-up display includes a graphic projection module for generating one or more graphic images upon the windscreen of the vehicle, a forward-facing camera collecting image data representative of a view of a surrounding environment of the vehicle visible through the windscreen, an ambient light sensor detecting a level of ambient light present in the surrounding environment of the vehicle, and one or more controllers. The one or more controllers are in electronic communication with the graphic projection module, the forward-facing camera, and the ambient light sensor and execute instructions to monitor the image data from the forward-facing camera until determining an object of interest is visible through the windscreen based on the image data. In response to determining the object of interest is visible through the windscreen, the one or more controllers determine one or more graphic images to be shown upon the windscreen to bring the object of interest to the attention of a user. The one or more controllers determine the level of ambient light present in the surrounding environment of the vehicle based on an ambient light signal received from the ambient light sensor. The one or more controllers adjust a saturation level of one or more colors of the one or more graphic images generated by the graphic projection module based on the level of ambient light present in the surrounding environment.

In another aspect, the one or more controllers execute instructions to instruct the graphic projection module to generate the one or more graphic images with an adjusted saturation level upon the windscreen.

In yet another aspect, adjusting the saturation level of the one or more colors of the one or more graphic images includes increasing the saturation level as the level of ambient light decreases and decreasing the saturation level as the level of ambient light increases.

In an aspect, the ambient light sensor detects three discrete levels of ambient light including a high level of light representative of a full daylight conditions, a medium level of light representative of overcast conditions, and a low level of light representative of dusk conditions.

In another aspect, the high level of light corresponds to a saturation level of sixty percent, the medium level of light corresponds to a saturation level of seventy percent, and the low level of light corresponds to a saturation level of eighty percent.

In yet another aspect, the saturation levels are increased by five percent for individuals who are at least forty years of age.

In an aspect, the one or more graphic images generated by the graphic projection module include two or more colors.

In another aspect, the one or more controllers execute instructions to compare color and luminance information corresponding to the two or more colors of the one or more graphic images generated by the graphic projection module for a potentially confusing color combination. In response to determining the potentially confusing color combination exists, the one or more controllers map color coordinates corresponding to the two or more colors on a color space chromaticity diagram as a first color and a second color.

In yet another aspect, the one or more controllers execute instructions to calculate a correlation coefficient between the first color and the second color and a copunctal point that is part of the color space chromaticity diagram, and compare the correlation coefficient with a threshold value, wherein values greater than the threshold value indicates the first color and the second color are a potentially confusing color pair.

In an aspect, in response to determining the correlation coefficient is greater than the threshold value, calculate a delta E value between the first color and the second color and compare the delta E value with a delta E threshold.

In another aspect, in response to determining the delta E value is less than the delta E threshold, the one or more controllers adjust the level of saturation and the level of luminance of at least one of the first color and the second color to increase the delta E value to above the delta E threshold, and instruct the graphic projection module to generate the one or more graphic images with increased delta E values upon the windscreen.

In yet another aspect, the forward-facing camera detects uncalibrated color and luminance information of the surrounding environment of the vehicle.

In an aspect, the one or more controllers execute instructions to transform the uncalibrated color and luminance information from the forward-facing camera into calibrated color and luminance information based on values stored in one or more look-up tables.

In another aspect, the one or more controllers execute instructions to compare the calibrated color and luminance information corresponding to a specific object located in the environment surrounding the vehicle with color and luminance information corresponding to two or more colors of the one or more graphic images generated by the graphic projection module to determine a potentially confusing color combination.

In another aspect, in response to determining a potentially confusing color combination exists, the one or more controllers map the calibrated color and luminance information corresponding to the specific object and the color coordinates of one of the two or more colors of the one or more graphic images on a color space chromaticity diagram as a third color and a fourth color.

In yet another aspect, the one or more controllers execute instructions to calculate a correlation coefficient between the third color and the fourth color and a copunctal point that is part of the color space chromaticity diagram. The one or more controllers compare the correlation coefficient with a threshold value, where a value greater than the threshold value indicates the third color and the fourth color are a potentially confusing color pair. In response to determining the correlation coefficient is greater than the threshold value, the one or more controllers calculate a delta E value between the third color and the fourth color. The one or more controllers then compare the delta E value with a delta E threshold.

In an aspect, in response to determining the delta E value is less than the delta E threshold, adjust a level of saturation and a level of luminance of the fourth color, which corresponds to one of the one or more graphic images to increase the delta E value to above the delta E threshold, and instruct the graphic projection module to generate the one or more graphic images with increased delta E values upon the windscreen.

In another aspect, a head-up display for displaying graphics upon a windscreen of a vehicle is disclosed. The head-up display includes a graphic projection module for generating one or more graphic images upon the windscreen of the vehicle, a forward-facing camera collecting image data representative of a view of a surrounding environment of the vehicle visible through the windscreen, and one or more controllers in electronic communication with the graphic projection module and the forward-facing camera. The one or more controllers executes instructions to monitor the image data from the forward-facing camera until determining an object of interest is visible through the windscreen based on the image data. In response to determining the object of interest is visible through the windscreen, the one or more controllers determine one or more graphic images to be shown upon the windscreen to bring the object of interest to the attention of a user, where the one or more graphic images include two or more colors. The one or more controllers compare the color and luminance information corresponding to the two or more colors of the one or more graphic images generated by the graphic projection module for a potentially confusing color combination that occurs in individuals with color vision deficiencies. In response to determining the potentially confusing color combination exists, the one or more controllers map color coordinates corresponding to the two or more colors on a color space chromaticity diagram as a first color and a second color. The one or more controllers calculate a correlation coefficient between the first color, the second color, and a copunctal point that is part of the color space chromaticity diagram. The one or more controllers compare the correlation coefficient with a threshold value, where a value greater than the threshold value indicates the first color and the second color are a potentially confusing color pair. In response to determining the correlation coefficient is greater than the threshold value, the one or more controllers calculate a delta E value between the first color and the second color. The one or more controllers compare the delta E value with a delta E threshold, and in response to determining the delta E value is less than the delta E threshold, the one or more controllers adjust a level of saturation and the level of luminance of at least one of the first color and the second color to increase the delta E value to above the threshold delta E. The one or more controllers instruct the graphic projection module to generate the one or more graphic images with increased delta E values upon the windscreen.

In another aspect, the forward-facing camera detects uncalibrated color and luminance information of the surrounding environment of the vehicle.

In an aspect, a method for displaying graphics upon a windscreen of a vehicle by a head-up display. The method includes monitoring, by one or more controllers, image data from a forward-facing camera until determining an object of interest is visible through the windscreen based on the image data, where the image data is representative of a view of a surrounding environment of the vehicle visible through the windscreen. In response to determining the object of interest is visible through the windscreen, the method includes determining one or more graphic images to be shown upon the windscreen to bring the object of interest to the attention of a user. The method includes determining a level of ambient light present in the surrounding environment of the vehicle based on an ambient light signal received from an ambient light sensor in electronic communication with the one or more controllers. Finally, the method includes adjusting a saturation level of one or more colors of the one or more graphic images generated by a graphic projection module based on the level of ambient light present in the surrounding environment.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
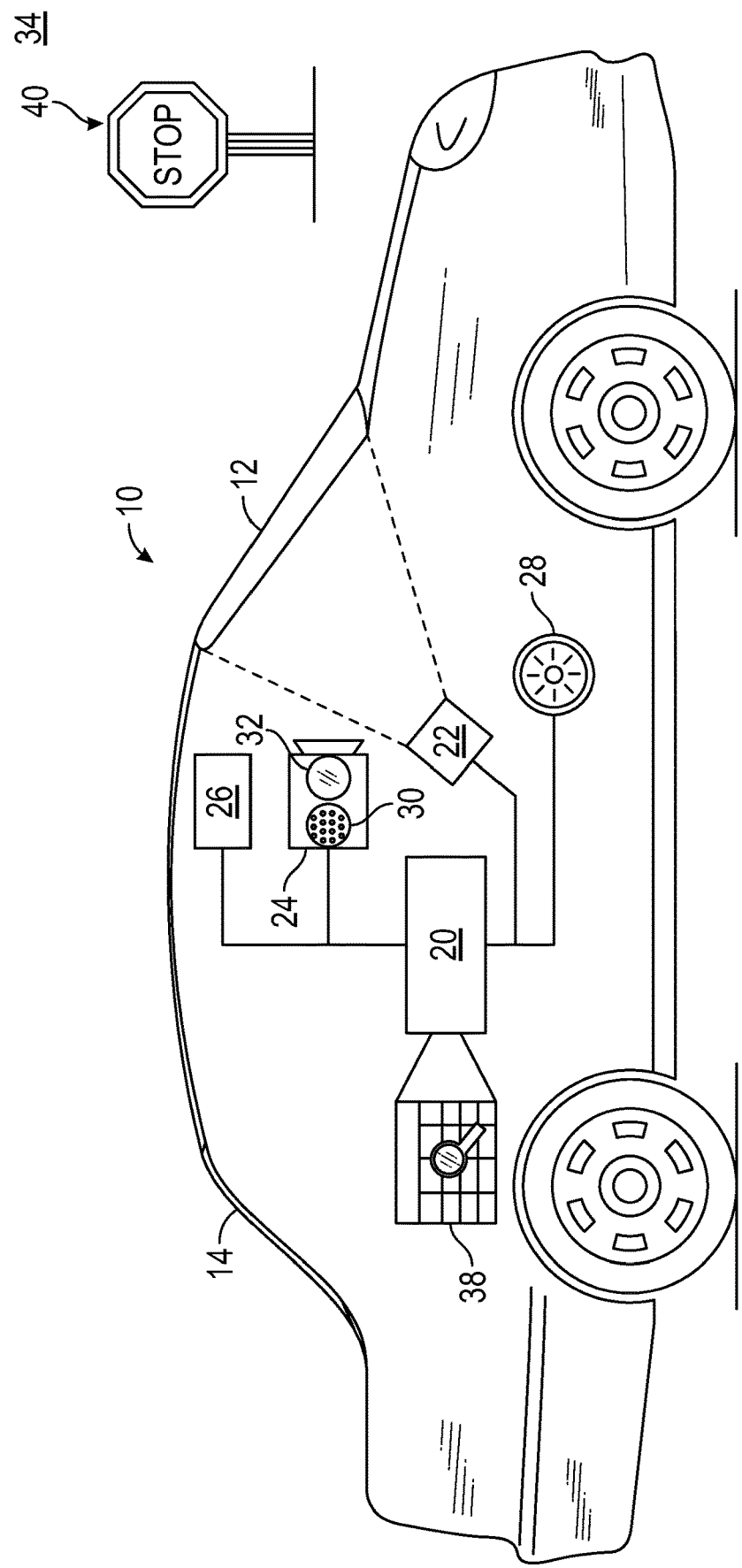
FIG. 1 is a schematic diagram of a vehicle including the disclosed head-up display system for displaying graphic images upon a windscreen, according to an exemplary embodiment.

Referring to FIG. 1, an exemplary head-up display 10 for generating graphics upon a windscreen 12 of a vehicle 14 is shown. As explained below, the head-up display 10 adjusts a level of saturation of an individual color and/or a level of luminance of colors that are part of the graphics generated upon the windscreen 12 of the vehicle 14 to accommodate color vision deficiencies of a user of the vehicle 14. The user is an occupant of the vehicle 14 and may be a driver or passenger. It is to be appreciated that the vehicle 14 may be any type of vehicle such as, but not limited to, a sedan, truck, sport utility vehicle, van, or motor home. The head-up display 10 includes one or more controllers 20 in electronic communication with a graphic projection module 22, a forward-facing camera 24, a tristimulus colorimeter 26, and an ambient light sensor 28.

The graphic projection module 22 is configured to generate images upon the windscreen 12 of the vehicle 14 and includes a projection device that creates an excitation light for projecting images. The forward-facing camera 24 obtains periodic or sequential images representing a view of a surrounding environment 34 of the vehicle 14 that is visible through the windscreen 12 of the vehicle 14. In one embodiment, the forward-facing camera 24 is a digital camera including a photosensor array 30 and a red, green, and blue (RGB) filter 32 that is placed over the photosensor array 30, where the forward-facing camera 24 detects uncalibrated color and luminance information of the surrounding environment 34 of the vehicle 14. Specifically, the uncalibrated color and luminance information detected by the forward-facing camera 24 includes an uncalibrated luminance value L, and uncalibrated color coordinates x and y based on the International Lighting Commission (CIE) 1931 color space chromaticity diagram.

The tristimulus colorimeter 26 is any type of device for detecting color and luminance information of the surrounding environment 34 of the vehicle 14 that is visible through the windscreen 12 of the vehicle 14. In an embodiment, the tristimulus colorimeter 26 is a spectroradiometer. The tristimulus colorimeter 26 detects color and luminance information of the surrounding environment 34 of the vehicle 14 (i.e., L, x, y), where the color and luminance information detected by the tristimulus colorimeter 26 is used to calibrate the uncalibrated luminance and color information received from the forward-facing camera 24. Specifically, the one or more controllers 20 store one or more transformation matrices or look-up tables 38 that correlate the uncalibrated color and luminance information from the forward-facing camera 24 with the color and luminance information from the tristimulus colorimeter 26 in memory. The one or more controllers 20 transform the uncalibrated color and luminance information from the forward-facing camera 24 into calibrated color and luminance information based on values stored in the one or more look-up tables 38. It is to be appreciated that in embodiments, the tristimulus colorimeter 26 is installed in the vehicle 14 during a process for calibrating the forward-facing camera 24 and is subsequently removed once the calibration is complete.

The ambient light sensor 28 is a photodetector configured to detect a level of ambient light present in the surrounding environment 34 of the vehicle 14. In one non-limiting embodiment, the ambient light sensor 28 detects three discrete levels of ambient light, namely, a high level of light, a medium level of light, and a low level of light. The high level of light is representative of full daylight conditions, the medium level of light is representative of overcast conditions, and the low level of light is representative of dusk conditions. Although three levels of ambient light are described, it is to be appreciated that fewer or more levels of ambient light may be defined as well. It is also to be appreciated that once the forward-facing camera 24 is calibrated, the forward-facing camera 24 may also be able to provide luminance information for each object located in the surrounding environment 34 as well.

Figure 2:
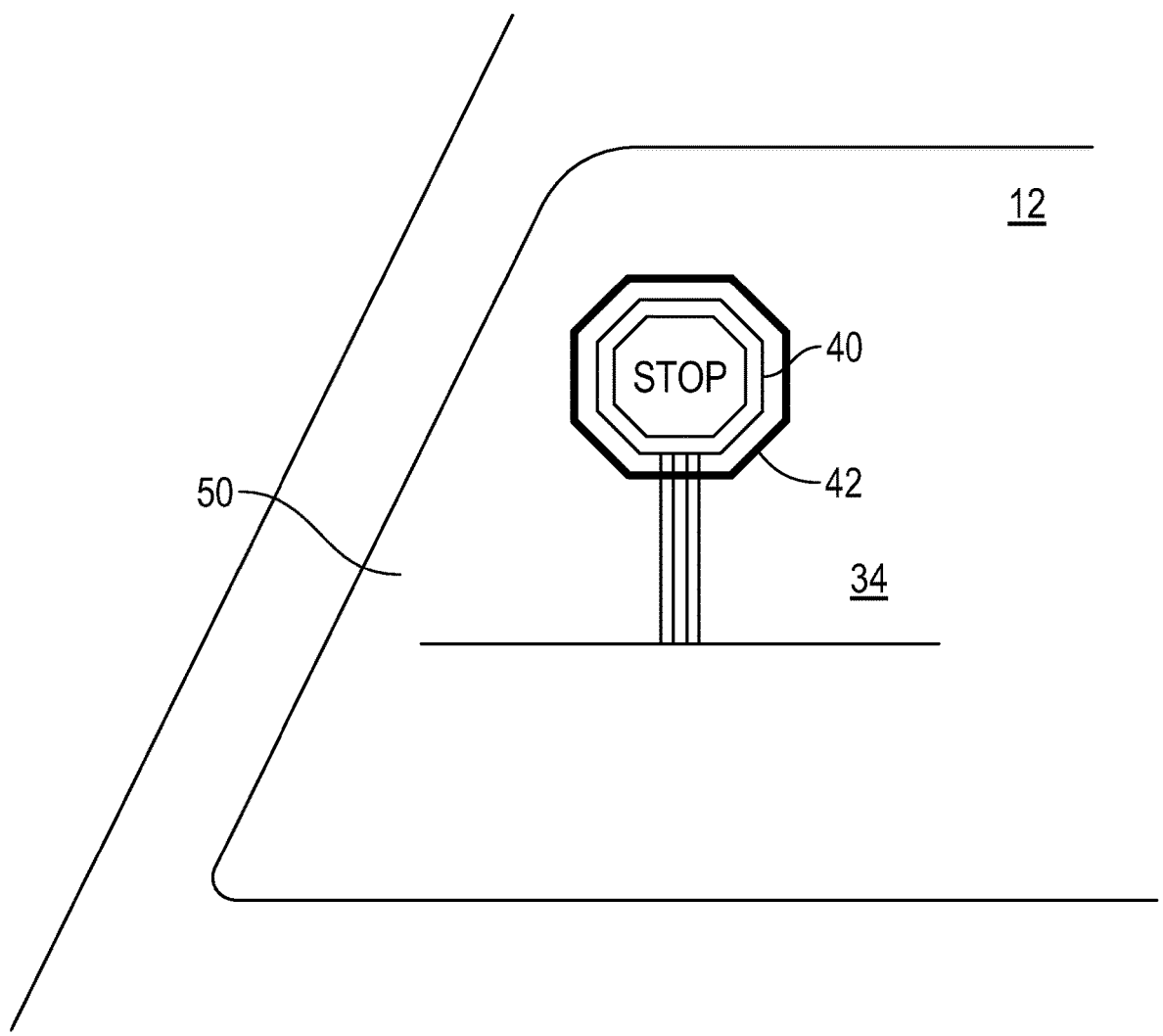
FIG. 2 is an interior view of the windscreen as the head-up display system generates a graphic image to highlight an object of interest, which is a road sign, according to an exemplary embodiment.

FIG. 2 is a front view of the windscreen 12, where an object of interest 40 located in the environment 34 surrounding the vehicle 14 is highlighted by one or more graphic images 42 generated upon the windscreen 12 by the graphic projection module 22 of the head-up display 10 (FIG. 1). In the example as shown in FIG. 2, the object of interest 40 is a street sign and the one or more graphic images 42 include an octagon that is drawn around the street sign, however, it is to be appreciated that FIG. 2 is merely exemplary in nature and the disclosure is not limited to specific objects of interest 40 or graphic images 42. As explained below, the head-up display 10 adjusts the level of saturation of one or more colors of the one or more graphic images 42 generated by the graphic projection module 22 based on the level of ambient light detected by the ambient light sensor 28 (shown in FIG. 1). Adjusting the level of saturation changes a saturation intensity of the one or more colors generated by the graphic projection module 22.

Referring to both FIGS. 1 and 2, the one or more controllers 20 monitor image data representing the view of the surrounding environment 34 of the vehicle 14 visible through the windscreen 12 of the vehicle 14 from the forward-facing camera 24. The one or more controllers 20 continue to monitor the image data until determining the object of interest 40 is located within an area 50 encompassing the windscreen 12 based on the image data. Although a stop sign is illustrated, it is to be appreciated that FIG. 2 is merely exemplary in nature, and the object of interest 40 is any object located in the surrounding environment 34 of the vehicle 14 that has the potential for color-luminance values that may be indistinguishable from other objects located within the surrounding environment 34. The head-up display 10 brings the object of interest 40 to a user's attention, where the object of interest 40 may include objects such as, for example, a child on a bicycle, another vehicle, weather conditions, roadway conditions, obstructions, pedestrians, emergency vehicles, point-of-interests, roadway signs, billboards, and destinations.

In response to determining the object of interest 40 is visible through the windscreen 12, the one or more controllers 20 then determine the one or more graphic images 42 to be shown upon the windscreen 12, where the graphic image 42 brings the object of interest 40 to the attention of the user. The graphic image 42 may be any type of graphic that highlights and brings the object of interest 40 to the attention of the user. Although FIG. 2 illustrates an octagon, the graphic image 42 may be any of graphic such as, for example, circles or boxes that surround an object of interest, arrows, warning symbols, text, numbers, colors, lines, indicators, and logos. The graphic image 42 includes one or more colors. In the example of FIG. 2, the graphic image 42 includes the color red.

The one or more controllers 20 then determine the level of ambient light present in the surrounding environment 34 of the vehicle 14 based on an ambient light signal received from the ambient light sensor 28. The one or more controllers 20 then adjust the saturation level of the one or more colors of the graphic image 42 generated by the graphic projection module 22 based on the level of ambient light present in the surrounding environment 34. Specifically, adjusting the saturation level of the one or more colors of the graphic image 42 includes increasing the saturation level as the level of ambient light decreases, and decreasing the saturation level as the level of ambient light increases. In other words, the saturation level increases as less ambient light is available. It is to be appreciated that an individual's color vision deficiencies may become pronounced at lower levels of ambient light, and the head-up display 10 accommodates the color vision deficiencies of a user of the vehicle 14 by adjusting the level of saturation of one or more colors shown by the head-up display 10 based on ambient light conditions.

In one non-limiting embodiment, the high level of light corresponds to a saturation level of about sixty percent, the medium level of light corresponds to a saturation level of about seventy percent, and the low level of light corresponds to a saturation level of about eighty percent. It is to be appreciated that the default saturation level is sixty percent. In one embodiment, the saturation levels may be adjusted for the age of a user, where the saturation levels are increased for individuals above a selected age. Specifically, in one embodiment, the saturation levels are increased by about five percent for individuals who are at least forty years of age. Therefore, the high level of light corresponds to a saturation level of about sixty-five percent, the medium level of light corresponds to a saturation level of about seventy-five percent, and the low level of light corresponds to a saturation level of about eighty-five percent.

Figure 3:
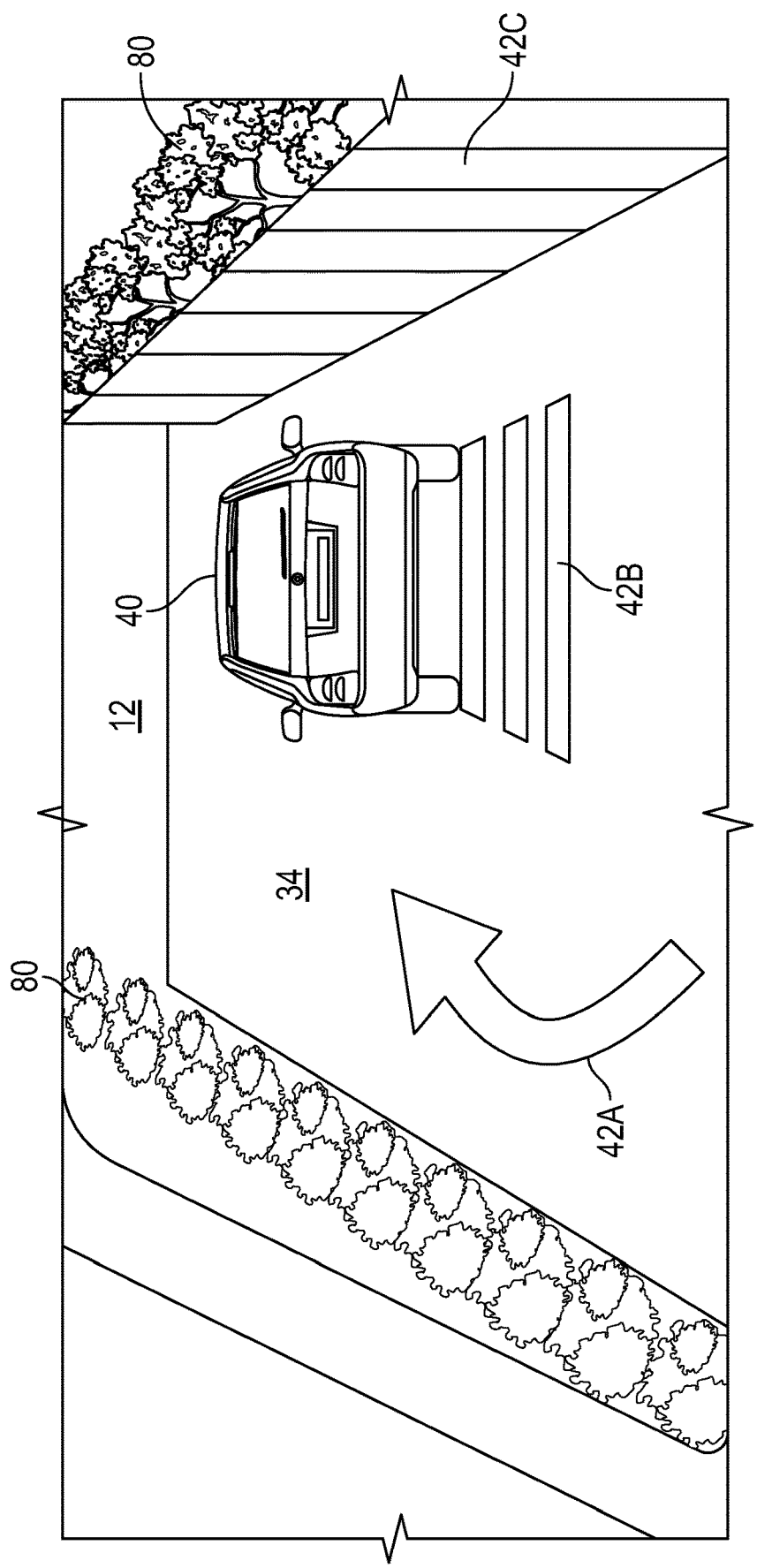
FIG. 3 is an alternative interior view of the windscreen as the head-up display system generates a plurality of graphic images to highlight an object of interest, which is a road vehicle, according to an exemplary embodiment.

FIG. 3 is a front view of the windscreen 12 illustrating an alternative environment 34 surrounding the vehicle 14. In the example as shown in FIG. 3, the object of interest 40 is a vehicle and a plurality of graphic images 42 are generated upon the windscreen 12 by the graphic projection module 22 of the head-up display 10 (FIG. 1). The plurality of graphic images 42 include two or more colors. Specifically, in the example as shown in FIG. 3, the graphic projection module 22 generates a green arrow 42A, a set of blue bars 42B, and a red wall 42C. As explained below, in one embodiment, the head-up display 10 adjusts the level of saturation and a level of luminance of the two or more colors generated by the graphic projection module 22 to avoid color confusion issues by a user having a color vison deficiency.

Figure 4:
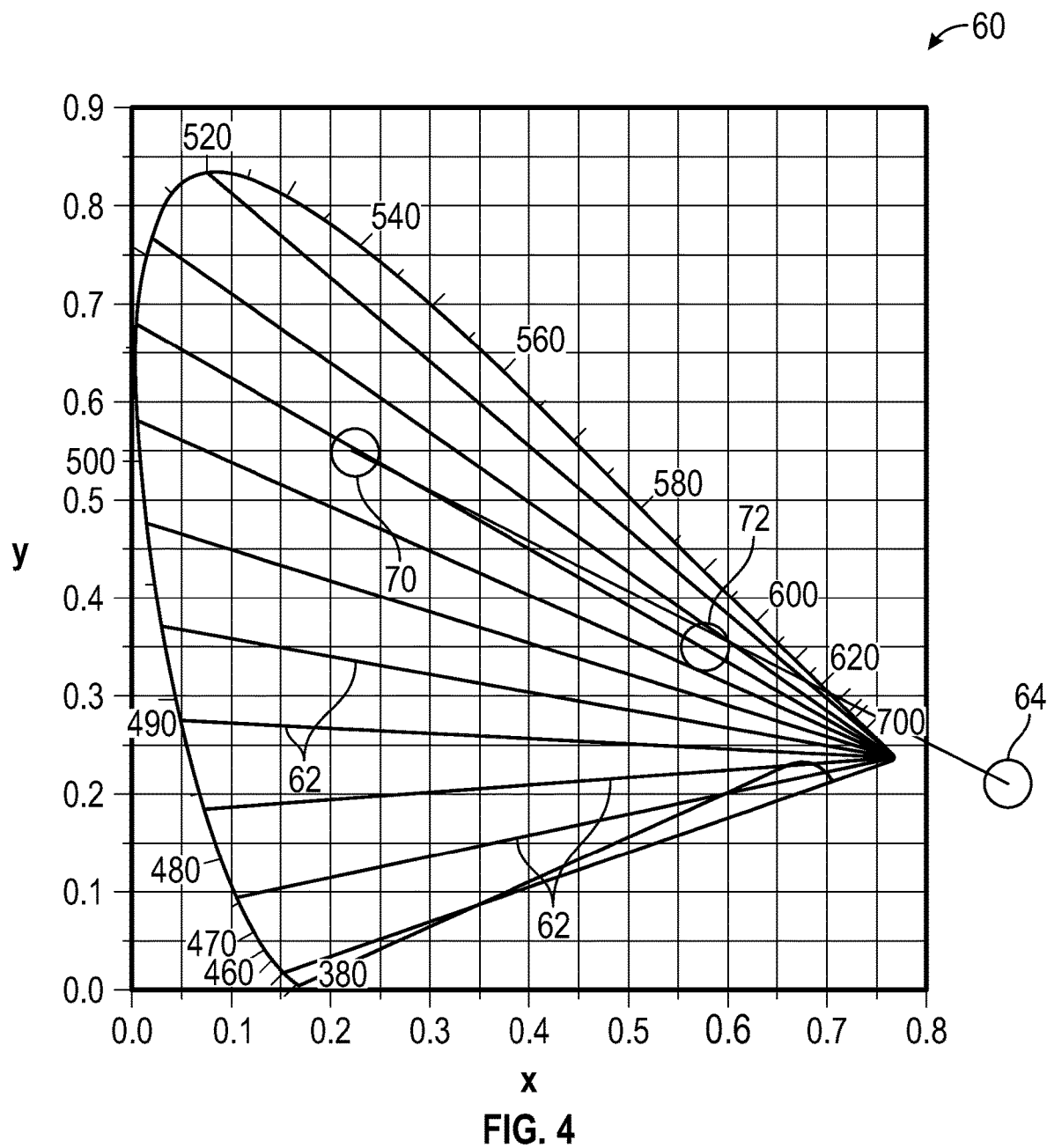
FIG. 4 illustrates a first color and a second color that are mapped on an exemplary color space chromaticity diagram.

Referring to FIGS. 1, 3, and 4, the one or more controllers 20 first compare the color and luminance information corresponding to the two or more colors of the plurality of graphic images 42 generated by the graphic projection module 22 for a potentially confusing color combination that occurs in individuals with color vision deficiencies. It is to be appreciated that potentially confusing color combinations may exist between the colors red and green, or between the colors blue and yellow. In the example as shown in FIG. 3, a potentially confusing color combination exists between the green arrow 42A and the red wall 42C. In response to determining a potentially confusing color combination exists between the two or more colors of the plurality of graphic images 42 generated by the graphic projection module 22, the one or more controllers 20 map the color coordinates (i.e., the x and y values) corresponding to the potentially confusing color combination on a color space chromaticity diagram 60 as a first color 70 and a second color 72, which is illustrated in FIG. 4.

In the embodiment as shown in FIG. 4, the color space chromaticity diagram 60 is the 1931 CIE color space chromaticity diagram. However, it is to be appreciated that FIG. 3 is merely exemplary in nature and that other types of color space chromaticity diagrams may be used as well such as, for example, the CIE 1976 L*a*b* color space chromaticity diagram. In the embodiment as shown in FIG. 4, the color space chromaticity diagram 60 is directed toward individuals who are affected with protanomaly, where the color space chromaticity diagram 60 includes a plurality of protan-based color confusion lines 62 that converge to a copunctal point 64.

In the example as shown in FIGS. 3 and 4, the green arrow 42A is mapped on the color space chromaticity diagram 60 as a first color 70 and the red wall 42C is mapped on the color space chromaticity diagram 60 as a second color 72. It is to be appreciated that since the color space chromaticity diagram 60 is directed toward individuals who are affected with protanomaly, the blue bars 42B are not mapped on the color space chromaticity diagram 60. That is, the first color 70 and the second color 72 that are mapped on the color space chromaticity diagram 60 are known color combinations that have the potential to create color confusion in individuals having color vision deficiencies.

The one or more controllers 20 then determine a position of the first color 70 and the second color 72 relative to the color confusion lines 62 and the copunctal point 64 on the color space chromaticity diagram 60 to identify a potentially confusing color pair. It is to be appreciated that colors co-located on the same color confusion lines 62 have the potential to create color confusion in individuals having color vision deficiencies. In the example as shown in FIG. 4, the first color 70 and the second color 72 are co-located on the same color confusion line 62. In one embodiment, the one or more controllers 20 identify a potentially confusing color pair by calculating a correlation coefficient between the first color 70 and the second color 72 mapped on the color space chromaticity diagram 60 and the copunctal point 64. In an embodiment, a correlation coefficient greater than 0.7 indicates the first color 70 and the second color 72 are a potentially confusing color pair, however, it is to be appreciated that the correlation coefficient may be adjusted based on the sensitivity of the head-up display 10.

In response to determining the first color 70 and the second color 72 are a potentially confusing color pair, the one or more controllers 20 calculate a delta E value between the first color 70 and the second color 72 that are mapped on the color space chromaticity diagram 60. The delta E value is a measure of change in visual perception between the first color 70 and the second color 72 that are mapped on the color space chromaticity diagram 60. When the delta E value is approximately equal to 2, all individuals (with or without a color vision deficiency) are unable to discriminate between the first color 70 and the second color 72.

A higher delta E value indicates a more significant color and luminance shift, and a lower delta E value indicates a less significant color and luminance shift. Specifically, in one embodiment, the one or more controllers 20 determine individuals with a color vision deficiency are unable to discriminate between the first color 70 and the second color 72 in response to determining the delta E value is less than a delta E threshold. In an embodiment, the delta E threshold is twenty, however, it is to be appreciated that the delta E threshold may be adjusted based on sensitivity. In response to determining individuals with a color vision deficiency are unable to discriminate between the first color 70 and the second color 72, the one or more controllers 20 adjust the level of saturation of at least one of the primary colors that are part of the first color 70 or the second color 72, and the level of luminance of at least one of the first color 70 and the second color 72 in order to increase the delta E value to above the delta E threshold. For example, if the level of saturation is adjusted for the color yellow, then at least one of the primary colors (i.e., in this example red and green) are adjusted at a subpixel level. This is because yellow luminance is created by mixing red and green. In this example, the yellow is located on a yellow-blue color confusion line, and the yellow is moved off the line by increasing the level of red at the subpixel level.

Referring to FIGS. 1 and 3, in another embodiment, the one or more controllers 20 also identify a potentially confusing color combination between the plurality of graphic images 42 generated by the head-up display 10 and objects 80 located in the environment 34 surrounding the vehicle 14. In the example as shown in FIG. 3, the objects 80 are vegetation such as trees and shrubbery that are the color green. The one or more controllers 20 obtain the uncalibrated color and luminance information detected by the forward-facing camera 24. As mentioned above, the one or more controllers 20 transform the uncalibrated color and luminance information from the forward-facing camera 24 into calibrated color and luminance information based on values stored in the one or more look-up tables 38.

Figure 5:
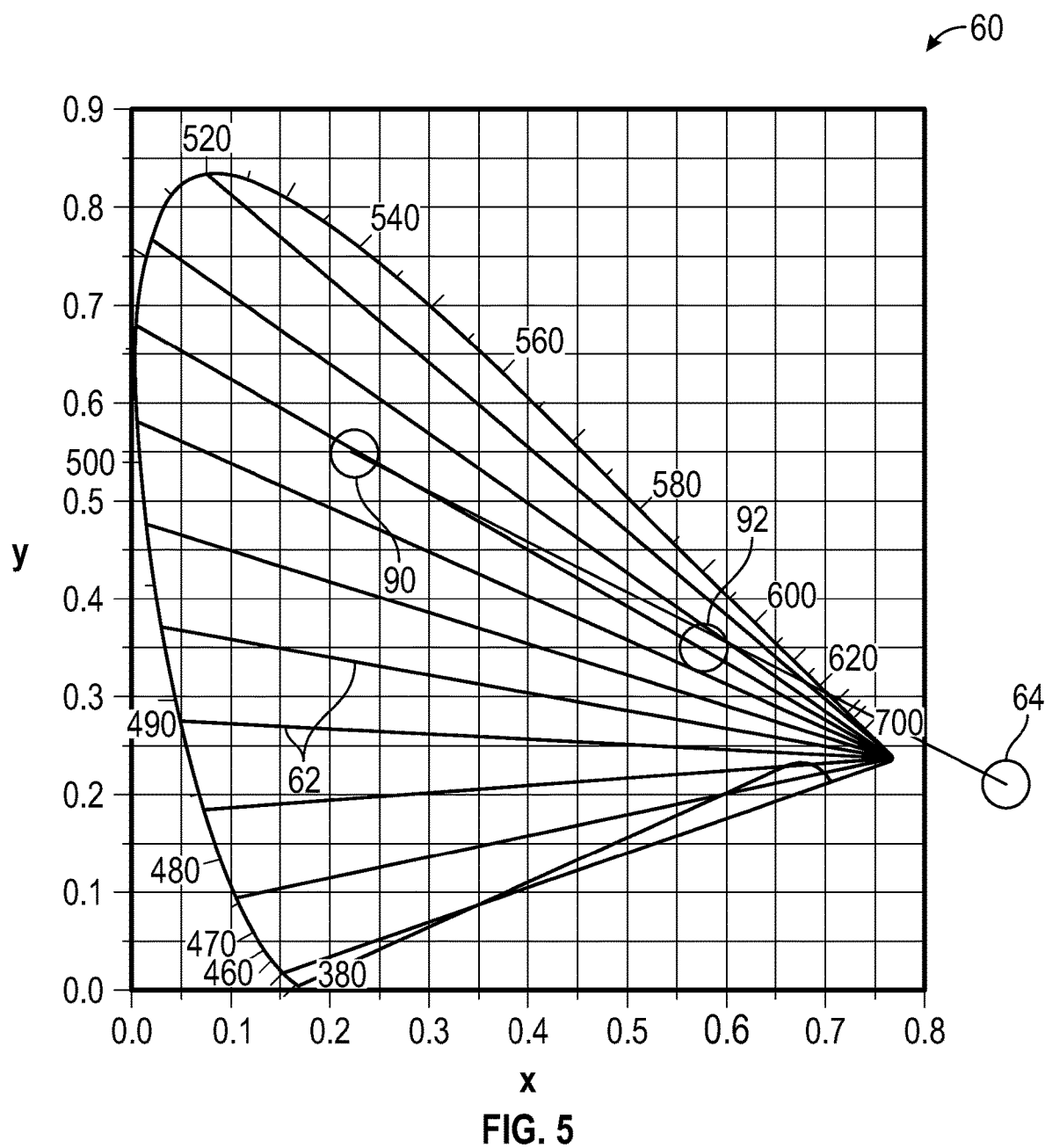
FIG. 5 illustrates a third color and a fourth color that are mapped on the color space chromaticity diagram.

The one or more controllers 20 then compare the calibrated color and luminance information for a specific object 80 located in the environment 34 surrounding the vehicle 14 with the color and luminance information corresponding to the colors of the plurality of graphic images 42 generated by the graphic projection module 22 for a potentially confusing color combination that occurs in individuals with color vision deficiencies. In the example as shown in FIG. 3, a potentially confusing color combination exists between the red wall 42C and the objects 80 that are vegetation and are the color green. In response to determining a potentially confusing color combination exists between the colors of the plurality of graphic images 42 generated by the graphic projection module 22 and the objects 80 located in the environment 34, the one or more controllers 20 map the color coordinates (i.e., the x and y values) corresponding to the specific object 80 and the color of one of the graphic images 42 on the color space chromaticity diagram 60 as a third color 90 and a fourth color 92, which is shown in FIG. 5. In the example as shown in FIG. 5, the third color 90 corresponds to the objects 80 located in the environment 34 that are vegetation and the fourth color 92 corresponds to the red wall 42C graphic.

As mentioned above, the one or more controllers 20 may then identify a potentially confusing color pair by calculating a correlation coefficient between the third color 90 and the fourth color 92 mapped on the color space chromaticity diagram 60 and the copunctal point 64. In an embodiment, a correlation coefficient greater than 0.7 indicates the third color 90 and the fourth color 92 are a potentially confusing color pair, however, it is to be appreciated that the correlation coefficient may be adjusted based on the sensitivity of the head-up display 10. In response to determining the third color 90 and the fourth color 92 are a potentially confusing color pair the one or more controllers 20 calculate a delta E value between the third color 90 and the fourth color 92 that are mapped on the color space chromaticity diagram 60. The one or more controllers 20 determine individuals with a color vision deficiency are unable to discriminate between the third color 90 and the fourth color 92 in response to determining the delta E value is less than a delta E threshold. As mentioned above, in an embodiment the delta E threshold is twenty, however, the value may be adjusted based on sensitivity. In response to determining individuals with a color vision deficiency are unable to discriminate between the third color 90 and the fourth color 92, the one or more controllers 20 adjust the level of saturation and the level of luminance of the fourth color 92, corresponds to the red wall 42C graphic seen in FIG. 3, in order to increase the delta E value to above twenty.

Figure 6:
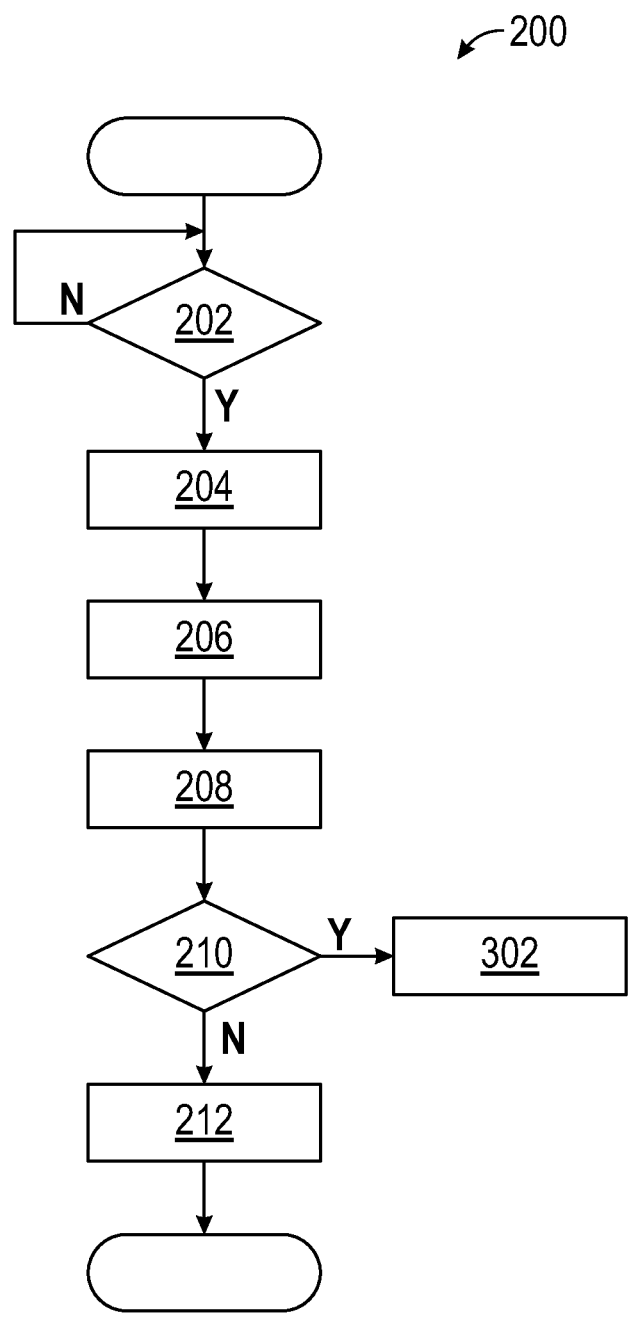
FIG. 6 is a process flow diagram illustrating a method for accommodating color vision deficiencies of a user of the vehicle by the head-up display shown in FIG. 1 based on ambient light levels, according to an exemplary embodiment.

FIG. 6 is a process flow diagram illustrating an exemplary method 200 for accommodating color vision deficiencies of a user of the vehicle 14 based on ambient light conditions. Referring generally to FIGS. 1, 2, 4, and 6, the method 200 may begin at decision block 202. In decision block 202, the one or more controllers 20 continue to monitor the image data from the forward-facing camera 24 until determining the object of interest 40 (FIG. 2) is visible through the windscreen 12 based on the image data. The method 200 may then proceed to block 204.

In block 204, in response to determining the object of interest 40 is visible through the windscreen 12, the one or more controllers 20 determine one or more graphic images 42 (seen in FIG. 2) to be shown upon the windscreen 12 to bring the object of interest 40 to the attention of the user. The method 200 may then proceed to block 206.

In block 206, the one or more controllers 20 determine the level of ambient light present in the surrounding environment 34 of the vehicle 14 based on the ambient light signal received from the ambient light sensor 28 (shown in FIG. 1). The method 200 may then proceed to block 208.

In block 208, the one or more controllers 20 adjust the saturation level of one or more colors of the one or more graphic images 42 generated by the graphic projection module 22 based on the level of ambient light present in the surrounding environment 34. The method 200 may then proceed to decision block 210.

Figure 7:
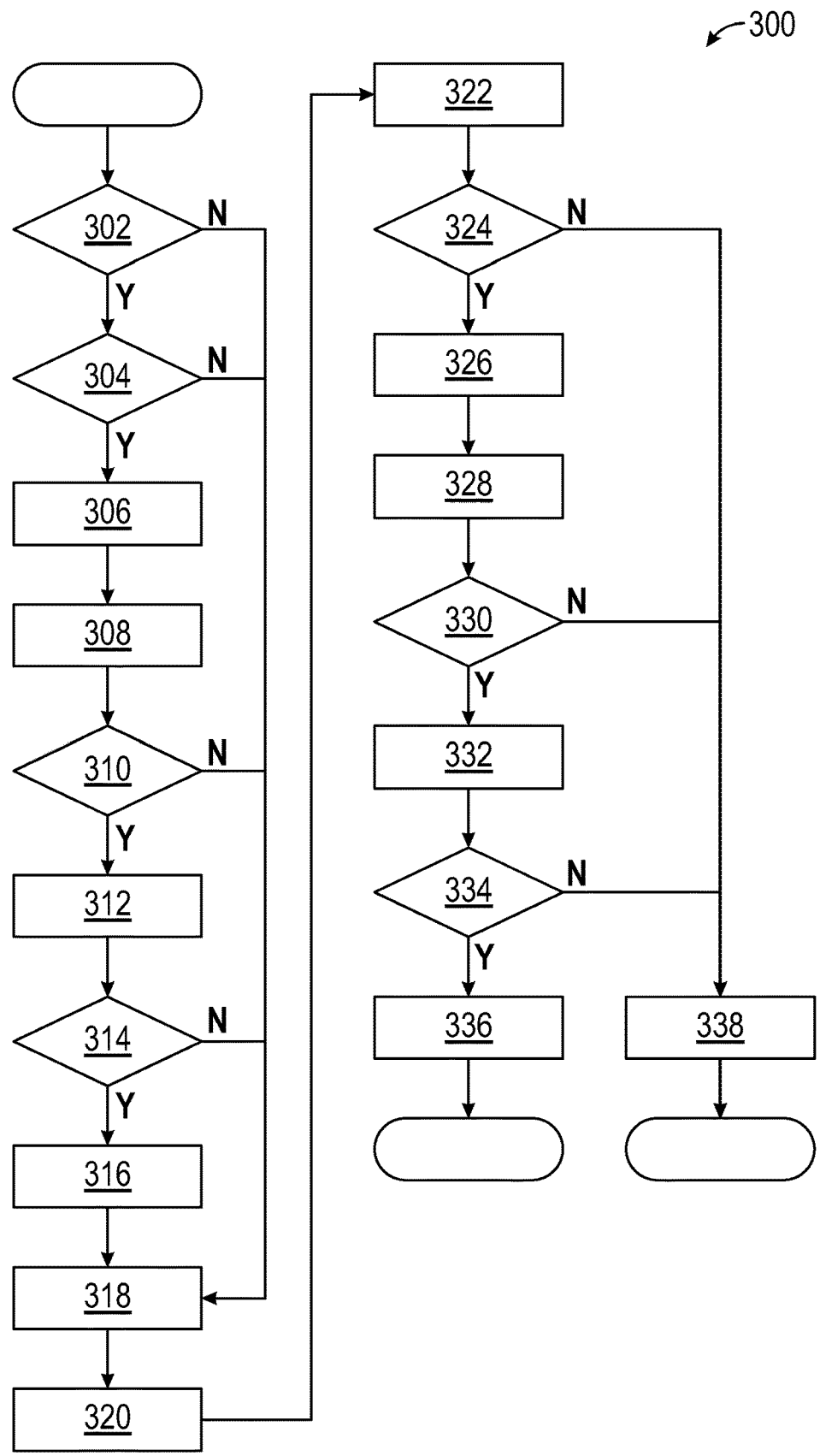
FIG. 7 is a process flow diagram illustrating a method for accommodating color vision deficiencies of the user of the vehicle by adjusting a level of saturation and a level of luminance of colors generated by the head-up display, according to an exemplary embodiment.

In decision block 210, if the one or more controllers 20 determine if there is a potentially confusing color combination for individuals with color vision deficiencies between the two or more colors of the one or more graphic images 42 generated by the graphic projection module 22, or between the colors generated by the graphic projection module 22 and objects 80 located in the environment 34 surrounding the vehicle 14 (FIG. 3), then the method 200 may terminate and proceed to decision block 302 of the method 300 shown in FIG. 7. However, if the one or more controllers 20 determine that no potentially confusing color combination for individuals with color vision deficiencies exist, then the method 200 may proceed to block 212.

In block 212, the one or more controllers 20 instruct the graphic projection module 22 to generate the one or more graphic images 42 with the adjusted saturation level upon the windscreen 12 of the vehicle 14. The method 200 may then terminate.

FIG. 7 is a process flow diagram illustrating a method 300 for accommodating color vision deficiencies of a user of the vehicle 14 by adjusting the level of saturation and the level of luminance of the colors generated by the graphic projection module 22 to avoid color confusion by a user having a color vison deficiency. Referring to FIGS. 1, 3-5, and 7, the method 300 begins at decision block 302. In decision block 302, if the one or more graphic images 42 generated by the graphic projection module 22 include more than one color, then the method proceeds to decision block 304. If the one or more graphic images 42 generated by the graphic projection module 22 do not include more than one color, the method 300 may proceed to block 318.

In decision block 304, the one or more controllers 20 compare the color and luminance information corresponding to the two or more colors of the plurality of graphic images 42 (seen in FIG. 3) generated by the graphic projection module 22 for a potentially confusing color combination that occurs in individuals with color vision deficiencies. In response to determining a potentially confusing color combination exists between the two or more colors of the plurality of graphic images 42 generated by the graphic projection module 22, the method 300 proceeds to block 306. In response to determining no potentially confusing color combination exists, the method 300 may proceed to block 318.

In block 306, the one or more controllers 20 map the color coordinates (i.e., the x and y values) corresponding to the two or more colors on the color space chromaticity diagram 60 as the first color 70 and the second color 72 (FIG. 4). The method 300 may then proceed to block 308.

In block 308, the one or more controllers 20 calculate the correlation coefficient between the first color 70 and the second color 72 mapped on the color space chromaticity diagram 60 and the copunctal point 64 (FIG. 4). The method 300 may then proceed to decision block 310.

In decision block 310, the one or more controllers 20 compare the correlation coefficient with a threshold value. In an embodiment, the threshold value is 0.7, where a value greater than the threshold value indicates the first color 70 and the second color 72 are a potentially confusing color pair. In response to determining the correlation coefficient is greater than the threshold value, the method 300 proceeds to block 312. If the correlation coefficient is less than the threshold value, then the method 300 proceed to block 318.

In block 312, in response to determining the first color 70 and the second color 72 are a potentially confusing color pair, the one or more controllers 20 calculate the delta E value between the first color 70 and the second color 72 that are mapped on the color space chromaticity diagram 60. The method 300 may then proceed to decision block 314.

In decision block 314, the delta E value is compared to a delta E threshold. In response to determining the delta E value is less than the delta E threshold, the one or more controllers 20 determine that individuals with a color vision deficiency are unable to discriminate between the first color 70 and the second color 72, and the method 300 proceeds to block 316. Otherwise, the method 300 proceed to block 318.

In block 316, in response to determining individuals with a color vision deficiency are unable to discriminate between the first color 70 and the second color 72, the one or more controllers 20 adjust the level of saturation and the level of luminance of at least one of the first color 70 and the second color 72 in order to increase the delta E value to above the delta E threshold. The method 300 may then proceed to block 318.

In block 318, the one or more controllers 20 obtain the uncalibrated color and luminance information detected by the forward-facing camera 24. The method 300 may then proceed to block 320.

In block 320, the one or more controllers 20 transform the uncalibrated color and luminance information from the forward-facing camera 24 into calibrated color and luminance information based on values stored in the one or more look-up tables 38 (FIG. 1). The method 300 may then proceed to block 322.

In block 322, the one or more controllers 20 then compare the calibrated color and luminance information corresponding to a specific object 80 located in the environment 34 surrounding the vehicle 14 with the color and luminance information corresponding to the two or more colors of the plurality of graphic images 42 generated by the graphic projection module 22 to determine a potentially confusing color combination that occur in individuals with color vision deficiencies. The method 300 may then proceed to decision block 324.

In decision block 324, in response to determining a potentially confusing color combination exists between the two or more colors of the plurality of graphic images 42 generated by the graphic projection module 22 and the objects 80 located in the environment 34, the method may proceed to block 326. Otherwise, the method proceeds to block 338.

In block 326, the one or more controllers 20 map the calibrated color coordinates (i.e., the x and y values) corresponding to the specific object 80 and the color coordinates of one of the two or more colors of the plurality of graphic images 42 on the color space chromaticity diagram 60 as a third color 90 and a fourth color 92, which is shown in FIG. 5. The method 300 may then proceed to block 328.

In block 328, the one or more controllers 20 calculate a correlation coefficient between the third color 90 and the fourth color 92 mapped on the color space chromaticity diagram 60 and the copunctal point 64. The method 300 may then proceed to decision block 330.

In decision block 330, the one or more controllers 20 determine if the correlation coefficient is greater than a threshold value. In an embodiment, the threshold value is 0.7, which indicates the third color 90 and the fourth color 92 are a potentially confusing color pair. In response to determining the correlation coefficient is greater than the threshold value, the method 300 proceeds to block 332. If the correlation coefficient is less than the threshold value, then the method 300 proceeds to block 338.

In block 332, in response to determining the third color 90 and the fourth color 92 are a potentially confusing color pair, the one or more controllers 20 calculate the delta E value between the third color 90 and the fourth color 92 that are mapped on the color space chromaticity diagram 60. The method 300 may then proceed to decision block 334.

In decision block 334, if the delta E value is greater than the delta E threshold, then individuals with a color vision deficiency are unable to discriminate between the third color 90 and the fourth color 92, and the method 300 proceeds to block 336. Otherwise, the method 300 proceed to block 338.

In block 336, In response to determining individuals with a color vision deficiency are unable to discriminate between the third color 90 and the fourth color 92, the one or more controllers 20 adjust the level of saturation and the level of luminance of the fourth color 92, which corresponds to the red wall 42C graphic seen in FIG. 3, in order to increase the delta E value to above twenty. The one or more controllers 20 then instruct the graphic projection module 22 to generate the one or more graphic images 42 with the increased delta E values upon the windscreen 12. The method 300 may then terminate.

In block 338, the one or more controllers 20 determine that a potentially confusing color combination does not exist between the colors of the plurality of graphic images 42 generated by the graphic projection module 22 and the objects 80 located in the environment 34, and therefore no further adjustment of the level of saturation and the level of luminance is required. The one or more controllers 20 then instruct the graphic projection module 22 to generate the one or more graphic images 42 with increased delta E values upon the windscreen 12. The method 300 may then terminate.

Referring generally to the figures, the disclosed head-up display provides various technical effects and benefits. Specifically, it is to be appreciated that an individual's color vision deficiencies may become pronounced at lower levels of ambient light, and the head-up display accommodates the color vision deficiencies of a user of the vehicle by adjusting the level of saturation of the colors generated by the head-up display based on ambient light conditions. Moreover, the disclosed head-up display also identifies potentially confusing color combinations that may exist between the graphic images generated by the head-up display, or between objects located in the environment and the graphic images generated by the head-up display. The head-up display adjusts the levels of saturation and luminance in response to eliminate the potentially confusing color combination, which also accommodates the color vision deficiencies of a user.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A head-up display for displaying graphics upon a windscreen of a vehicle, the head-up display comprising:
  a graphic projection module for generating one or more graphic images upon the windscreen of the vehicle;
  a forward-facing camera collecting image data representative of a view of a surrounding environment of the vehicle visible through the windscreen;
  an ambient light sensor detecting a level of ambient light present in the surrounding environment of the vehicle; and
  one or more controllers in electronic communication with the graphic projection module, the forward-facing camera, and the ambient light sensor, wherein the one or more controllers executes instructions to:
    monitor the image data from the forward-facing camera until determining an object of interest is visible through the windscreen based on the image data;
    in response to determining the object of interest is visible through the windscreen, determine one or more graphic images to be shown upon the windscreen to bring the object of interest to the attention of a user;
    determine the level of ambient light present in the surrounding environment of the vehicle based on an ambient light signal received from the ambient light sensor; and
    adjust a saturation level of one or more colors of the one or more graphic images generated by the graphic projection module based on the level of ambient light present in the surrounding environment, wherein adjusting the saturation level of the one or more colors of the one or more graphic images includes increasing the saturation level as the level of ambient light decreases and decreasing the saturation level as the level of ambient light increases.

2. The head-up display of claim 1, wherein the one or more controllers execute instructions to:
  instruct the graphic projection module to generate the one or more graphic images with an adjusted saturation level upon the windscreen.

3. The head-up display of claim 1, wherein the ambient light sensor detects three discrete levels of ambient light including a high level of light representative of a full daylight conditions, a medium level of light representative of overcast conditions, and a low level of light representative of dusk conditions.

4. The head-up display of claim 3, wherein the high level of light corresponds to a saturation level of sixty percent, the medium level of light corresponds to a saturation level of seventy percent, and the low level of light corresponds to a saturation level of eighty percent.

5. The head-up display of claim 4, wherein saturation levels are increased by five percent for users who are at least forty years of age.

6. The head-up display of claim 1, wherein the one or more graphic images generated by the graphic projection module includes two or more colors.

7. The head-up display of claim 6, wherein the one or more controllers execute instructions to:
  compare color and luminance information corresponding to the two or more colors of the one or more graphic images generated by the graphic projection module for a potentially confusing color combination; and
  in response to determining the potentially confusing color combination exists, map color coordinates corresponding to the two or more colors on a color space chromaticity diagram as a first color and a second color.

8. The head-up display of claim 7, wherein the one or more controllers execute instructions to:

calculate a correlation coefficient between the first color and the second color and a copunctal point that is part of the color space chromaticity diagram; and compare the correlation coefficient with a threshold value, wherein values greater than the threshold value indicates the first color and the second color are a potentially confusing color pair.

9. The head-up display of claim 8, wherein the one or more controllers execute instructions to:

in response to determining the correlation coefficient is greater than the threshold value, calculate a delta E value between the first color and the second color; and compare the delta E value with a delta E threshold.

10. The head-up display of claim 9, wherein the one or more controllers execute instructions to:

in response to determining the delta E value is less than the delta E threshold, adjust the level of saturation and the level of luminance of at least one of the first color and the second color to increase the delta E value to above the delta E threshold; and instruct the graphic projection module to generate the one or more graphic images with increased delta E values upon the windscreen.

11. The head-up display of claim 1, wherein the forward-facing camera detects uncalibrated color and luminance information of the surrounding environment of the vehicle.

12. The head-up display of claim 11, wherein the one or more controllers execute instructions to:

transform the uncalibrated color and luminance information from the forward-facing camera into calibrated color and luminance information based on values stored in one or more look-up tables.

13. The head-up display of claim 12, wherein the one or more controllers execute instructions to:

compare the calibrated color and luminance information corresponding to a specific object located in the environment surrounding the vehicle with color and luminance information corresponding to two or more colors of the one or more graphic images generated by the graphic projection module to determine a potentially confusing color combination.

14. The head-up display of claim 13, wherein the one or more controllers execute instructions to:

in response to determining a potentially confusing color combination exists, map the calibrated color and luminance information corresponding to the specific object and the color coordinates of one of the two or more colors of the one or more graphic images on a color space chromaticity diagram as a third color and a fourth color.

15. The head-up display of claim 14, wherein the one or more controllers execute instructions to:

calculate a correlation coefficient between the third color and the fourth color and a copunctal point that is part of the color space chromaticity diagram;

compare the correlation coefficient with a threshold value, wherein a value greater than the threshold value indicates the third color and the fourth color are a potentially confusing color pair;

in response to determining the correlation coefficient is greater than the threshold value, calculate a delta E value between the third color and the fourth color; and compare the delta E value with a delta E threshold.

16. The head-up display of claim 15, wherein the one or more controllers execute instructions to:

in response to determining the delta E value is less than the delta E threshold, adjust a level of saturation and a level of luminance of the fourth color, which corresponds to one of the one or more graphic images to increase the delta E value to above the delta E threshold; and instruct the graphic projection module to generate the one or more graphic images with increased delta E values upon the windscreen.

17. A head-up display for displaying graphics upon a windscreen of a vehicle, the head-up display comprising:

a graphic projection module for generating one or more graphic images upon the windscreen of the vehicle;

a forward-facing camera collecting image data representative of a view of a surrounding environment of the vehicle visible through the windscreen; and one or more controllers in electronic communication with the graphic projection module and the forward-facing camera, wherein the one or more controllers executes instructions to:

monitor the image data from the forward-facing camera until determining an object of interest is visible through the windscreen based on the image data;

in response to determining the object of interest is visible through the windscreen, determine one or more graphic images to be shown upon the windscreen to bring the object of interest to the attention of a user, wherein the one or more graphic images include two or more colors;

compare the color and luminance information corresponding to the two or more colors of the one or more graphic images generated by the graphic projection module for a potentially confusing color combination that occurs in individuals with color vision deficiencies;

in response to determining the potentially confusing color combination exists, map color coordinates corresponding to the two or more colors on a color space chromaticity diagram as a first color and a second color;

calculate a correlation coefficient between the first color, the second color, and a copunctal point that is part of the color space chromaticity diagram;

compare the correlation coefficient with a threshold value, wherein a value greater than the threshold value indicates the first color and the second color are a potentially confusing color pair;

in response to determining the correlation coefficient is greater than the threshold value, calculate a delta E value between the first color and the second color;

compare the delta E value with a delta E threshold;

in response to determining the delta E value is less than the delta E threshold, adjust a level of saturation and the level of luminance of at least one of the first color and the second color to increase the delta E value to above the threshold delta E; and instruct the graphic projection module to generate the one or more graphic images with increased delta E values upon the windscreen.

18. The head-up display of claim 17, wherein the forward-facing camera detects uncalibrated color and luminance information of the surrounding environment of the vehicle.

19. A head-up display for displaying graphics upon a windscreen of a vehicle, the head-up display comprising:

a graphic projection module for generating one or more graphic images upon the windscreen of the vehicle, wherein the one or more graphic images generated by the graphic projection module includes two or more colors;

a forward-facing camera collecting image data representative of a view of a surrounding environment of the vehicle visible through the windscreen;

an ambient light sensor detecting a level of ambient light present in the surrounding environment of the vehicle; and one or more controllers in electronic communication with the graphic projection module, the forward-facing camera, and the ambient light sensor, wherein the one or more controllers executes instructions to:

monitor the image data from the forward-facing camera until determining an object of interest is visible through the windscreen based on the image data;

in response to determining the object of interest is visible through the windscreen, determine one or more graphic images to be shown upon the windscreen to bring the object of interest to the attention of a user;

determine the level of ambient light present in the surrounding environment of the vehicle based on an ambient light signal received from the ambient light sensor;

adjust a saturation level of one or more colors of the one or more graphic images generated by the graphic projection module based on the level of ambient light present in the surrounding environment;

compare color and luminance information corresponding to the two or more colors of the one or more graphic images generated by the graphic projection module for a potentially confusing color combination; and in response to determining the potentially confusing color combination exists, map color coordinates corresponding to the two or more colors on a color space chromaticity diagram as a first color and a second color.

20. The head-up display of claim 19, wherein the one or more controllers execute instructions to:

calculate a correlation coefficient between the first color and the second color and a copunctal point that is part of the color space chromaticity diagram; and compare the correlation coefficient with a threshold value, wherein values greater than the threshold value indicates the first color and the second color are a potentially confusing color pair.

* * * * *